C. F. SHERWOOD.
SHAFT BEARING.
APPLICATION FILED FEB. 24, 1920.
1,376,043.
Patented Apr. 26, 1921.
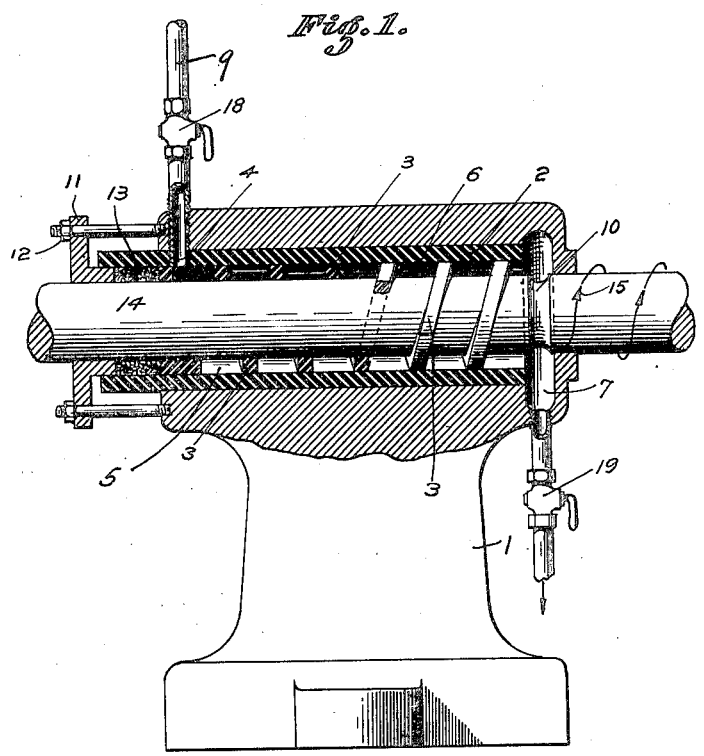
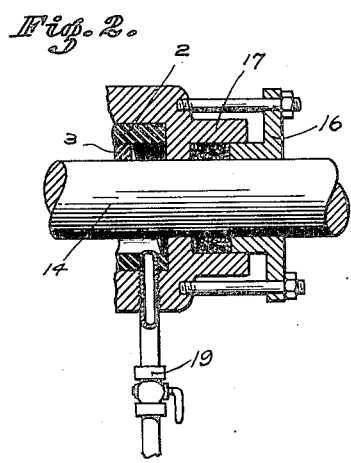
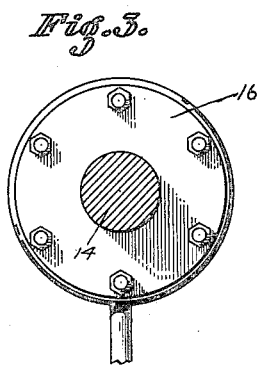
INVENTOR
CHARLES FREDERIC SHERWOOD
BY
ATTORNEY.

UNITED STATES PATENT OFFICE.

CHARLES FREDERIC SHERWOOD, OF LOS ANGELES, CALIFORNIA.

SHAFT-BEARING.

1,376,043.  Specification of Letters Patent.  Patented Apr. 26, 1921.

Application filed February 24, 1920. Serial No. 360,703.

*To all whom it may concern:*

Be it known that I, CHARLES FREDERIC SHERWOOD, a citizen of the United States, and a resident of the city of Los Angeles, county of Los Angeles, and State of California, have invented new and useful Improvements in Shaft-Bearings, of which the following is a specification.

My invention is particularly applicable to bearing supporting structures, adapted to carry shafts in damp or exposed positions, or under water, and is particularly useful in such machines as centrifugal pumps, step bearings, flotation, and other mining machinery.

In this class of machinery it is very difficult to secure or maintain lubrication with any oil or grease, and with the ordinary form of bearing, a shaft journal is quickly and frequently destroyed by friction or grit carried by water.

In a preferred form of my invention I employ a hard rubber or other suitable sleeve within which is formed a relatively soft hubber spiral, serving as a bearing surface on which the shaft is adapted to rotate, and I supply water or other suitable lubricant around the rubber spiral and around the rotating shaft. The use of rubber or other resilient or yielding material for bearing purposes may be distinguished from metallic bearing surfaces due to the fact that it is flexible, resulting in an equalization of support over the entire bearing surface. When this bearing surface is wetted, a relative freedom from friction is apparent. Furthermore by the use of rubber or other resilient material for a bearing surface, sand or grit will not embed itself therein as is the case with a metal bearing where the metal surface acts as a tool-holder for sand, thereby causing a scoring and cutting of the shaft by sand.

It will be noted that these objects are accomplished by providing a flexible water resisting surface on which the shaft journal is adapted to operate, and constructing and assembling the parts such that a water film is established and maintained between the shaft journal and the bearing surface. By arranging the bearing material in spiral form having journal spaces exposed between the spirals so that the wetted surface is constantly established on the journal, the said wetted surface is carried as a film and effectually lubricates the journal during its period of rotation on the bearing surface. Moreover, any grit or foreign material is removed from the journal as it rotates within the spiral and is scoured off by the edges of the bearing material, and thus retained within the spiral channel on each side of the said bearing material and carried away by circulating water.

The adhesion of the water on the shaft in combination with the spiral channel also results in the water being forced through the bearing and under material pressure.

By referring to the accompanying drawings my invention will be made clear.

Figure 1 is a cross section of a pedestal type of bearing employing my invention.

Fig. 2 is a detail variation in which a gland may be used at each end.

Fig. 3 is a front view of the gland end at right angles to Fig. 1.

Numeral 1 indicates a bearing pedestal within which I prefer to mount a bearing shell 2, and which latter may advantageously be made of rubber, or the well known metal sleeve may be pressed in or otherwise assembled with the bearing pedestal 1.

Within this sleeve I mount a bearing cut spirally and of rubber, or other resilient or yielding material, as indicated at 3. If the shell 2 be made of hard rubber the spiral 3 should preferably be made of a softer grade of rubber and may be vulcanized thereto. This provides an easy way of securing the rubber spiral to the bearing pedestal. However, if the shell 2 be made of metal the spiral 3 may be dovetailed or otherwise affixed thereto.

At one end of the bearing spiral I provide a connection 4 through which water may be supplied and which water travels through the spiral space 5, 6, and is discharged at the annular well 7 and then through the discharge pipe 8; or may if desired be used to circulate, entering again through pipe 9. In order to facilitate the discharge of the water in the well 7, as it comes from the spiral passageway 6, a groove as 10 may be cut slightly below the surface of the shaft, or a projecting collar may be mounted thereon in order to provide interruption in the surface of the journal, which will cause an interruption in the flow of the water along the journal surface and secure its discharge at 7.

A suitable collar or packing gland of any well known form may be provided as at 11, which upon the tightening of the nut 12 will compress the packing material 13, and thus prevent water leakage along the shaft 14. The water from pipe 9 which finds its inlet to the spiral 5 through the opening 4 will however travel along the bearing spiral toward 6 and be discharged at 7 as the shaft rotates in the direction of the arrow 15. It will thus be seen that every portion of the shaft journal is exposed during every revolution to contact with this spiral water and the water film will therefore be carried by the shaft surface across the supporting rubber or yielding or resilient faces as 3, 3, thus providing water lubrication with a minimum of frictional resistance and a maximum cooling effect. Any foreign material that may be carried by the water will be carried out through the passageways as 5, 6, and will be prevented by the edges of the rubber spiral 3, 3, from frictional contact with the bearing surfaces thereof. It will therefore be seen that with my invention the yielding spiral as 3, 3, provides an equal support over every unit of area for the shaft journal with constant lubrication provided from the spiral passageway therebetween in which the water or other liquid is caused to flow.

In some forms of apparatus it will be found advantageous to fit both ends of the bearing with a gland as indicated in Fig. 2 by the numerals 16, 17, which may be a duplicate of that on the opposite end indicated by the numerals 11 and 13. By this construction water or other fluid pressure may be introduced between the spiral surfaces 3, 3, and through the channel 5, 6, at any suitable pressure, which pressure may be established and maintained by manipulating valves 18, 19 on the supply and discharge for the said lubricant, thus in effect securing forced lubrication.

I claim:

1. In a bearing, a bearing surface of resilient or yielding material and of spiral form adapted to support a rotating shaft and means for circulating a fluid between the spirals and in contact with the journal, said means consisting of an inlet for said fluid at one end of the spiral and an outlet at the opposite end of the spiral.

2. In a bearing, a bearing surface of resilient or yielding material and of spiral form adapted to support a rotating shaft, and means for circulating a fluid between the spirals and in contact with the journal, said means consisting of an inlet for said fluid at one end of the spiral and an outlet at the opposite end of the spiral, and means preventing the egress of the fluid at the inlet of the spiral.

3. In a bearing, a bearing surface of rubber, and of spiral form, adapted to support a rotating shaft.

4. In a bearing, a bearing surface of rubber and of spiral form, adapted to support a rotating shaft, and means for circulating a fluid between the spirals and in contact with the journal.

5. In a bearing, a bearing surface of rubber and of spiral form, adapted to support a rotating shaft and means for circulating a fluid between the spirals and in contact with the journal, said means consisting of an inlet for said fluid at one end of the spiral and an outlet at the opposite end of the spiral.

6. In a bearing, a bearing surface of rubber and of spiral form, adapted to support a rotating shaft and means for circulating a fluid between the spirals and in contact with the journal, said means consisting of an inlet for said fluid at one end of the spiral and an outlet at the opposite end of the spiral, and means preventing the egress of the fluid at the inlet of the spiral.

7. In a bearing, a bearing surface essentially of rubber having a spiral channel grooved on its surface to pass a lubricant therethrough.

8. A bearing for a shaft having a surface essentially of rubber, spirally grooved on its surface, and a fluid lubricant between the shaft and the bearing surface.

In testimony whereof, I have hereunto set my hand at San Francisco, California, this 17th day of February, 1920.

CHARLES FREDERIC SHERWOOD.

In presence of—
P. S. PIDWELL,
A. W. BOYKEN.